No. 867,311. PATENTED OCT. 1, 1907.
G. W. SHEM & H. W. ISRAEL.
INGOT STRIPPING MECHANISM.
APPLICATION FILED JAN. 9, 1907.

4 SHEETS—SHEET 4.

WITNESSES
INVENTORS

UNITED STATES PATENT OFFICE.

GEORGE W. SHEM AND HOMER W. ISRAEL, OF ALLIANCE, OHIO, ASSIGNORS TO THE ALLIANCE MACHINE COMPANY, A CORPORATION OF OHIO.

INGOT-STRIPPING MECHANISM.

No. 867,311.      Specification of Letters Patent.      Patented Oct. 1, 1907.

Application filed January 9, 1907. Serial No. 351,402.

To all whom it may concern:

Be it known that I, GEORGE W. SHEM and HOMER W. ISRAEL, both of Alliance, Stark county, Ohio, have invented a new and useful Ingot-Stripping Mechanism, of which the following is a full, clear, and exact description, reference being had to the accompanying drawings, forming part of this specification, in which—

Figure 1:
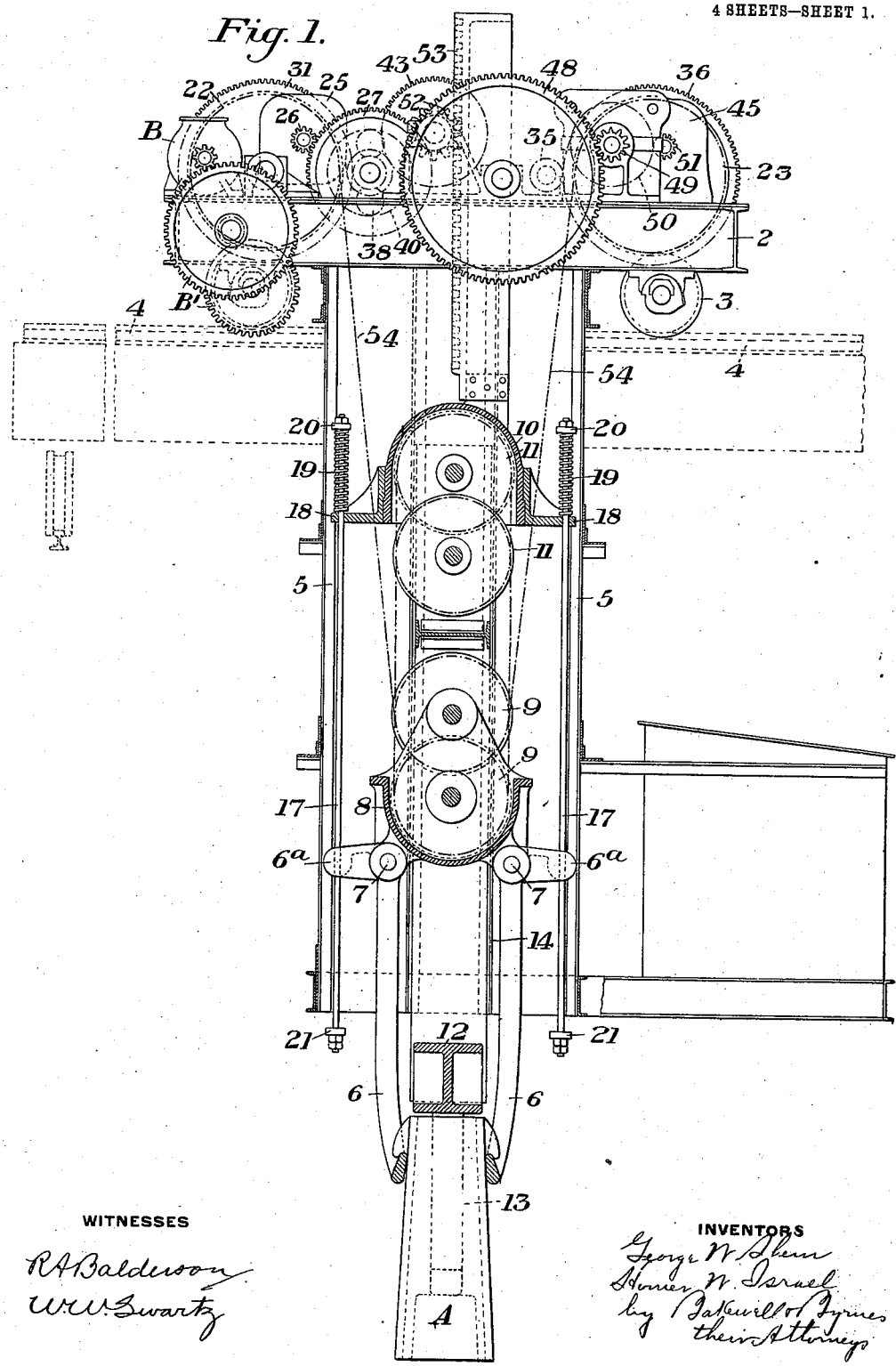
Figure 2:
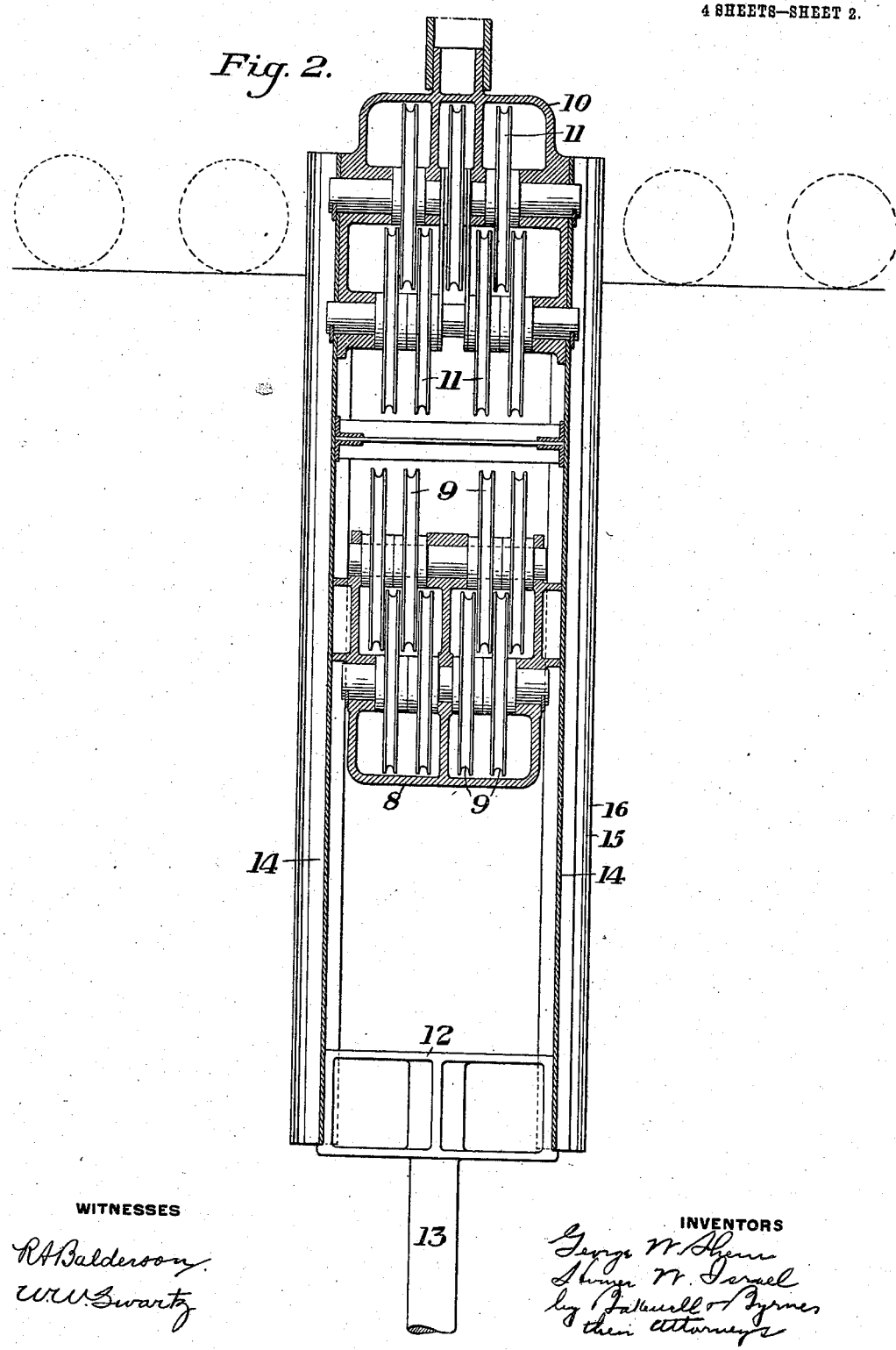
Figure 3:
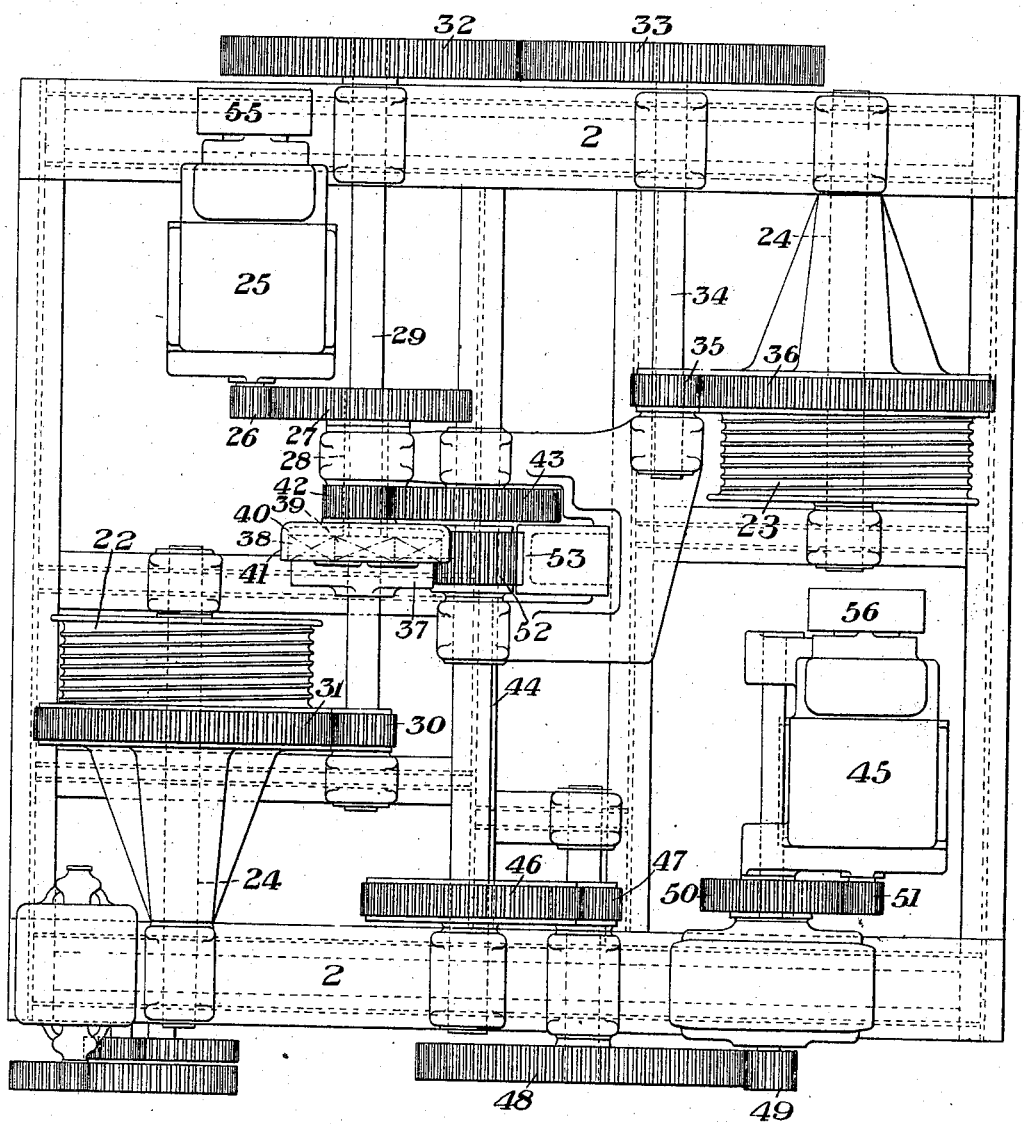
Figure 4:
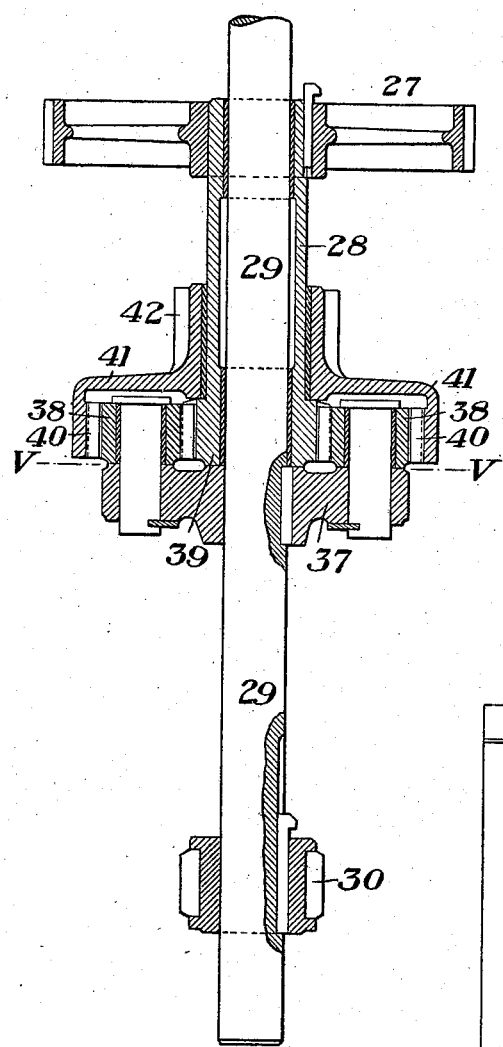
Figure 5:
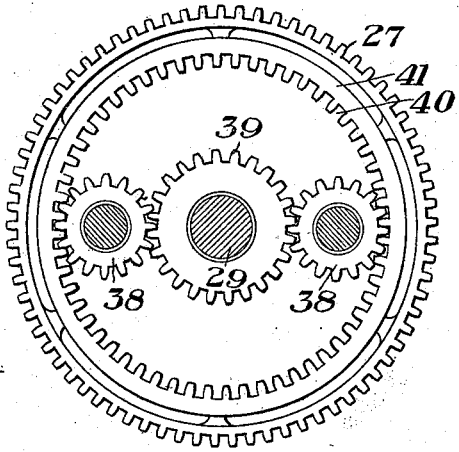
Figure 6:
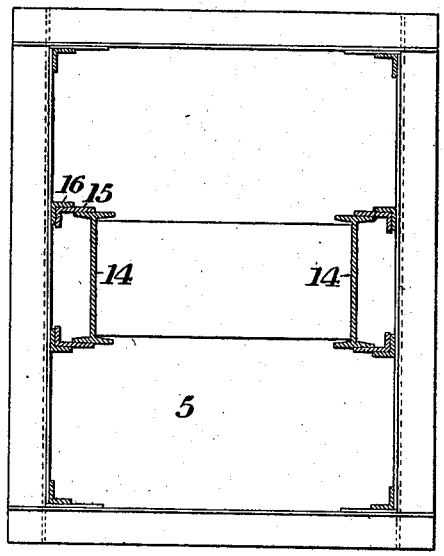

Figure 1 is a sectional side elevation of ingot stripping mechanism embodying our invention; Fig. 2 is a vertical section of the stripping column and cross-heads; Fig. 3 is a plan view of the trolley on a larger scale; Figs. 4 and 5 are detail sectional views of the planetary gearing; and Fig. 6 is a cross-section through the dependent guide frame and stripping column.

Our invention has relation to ingot stripping mechanism, and is designed to provide simple and efficient mechanism of this character having improved gearing which can be operated at a slow speed during the stripping operation, and at a greatly increased speed as soon as the stripping operation is completed, and the ingot mold is being raised for transfer.

Other objects and advantages of our invention will hereinafter appear.

With these objects in view, our invention consists in the novel construction, arrangement and combination of parts, all substantially as hereinafter as described and pointed out in the appended claims.

Referring to the accompanying drawings which illustrate one embodiment of our invention, the numeral 2 designates the frame of the trolley which is mounted upon wheels 3 to run upon a suitable track 4, being actuated by a motor B and gearing B'. Depending from the frame 2 is a vertical hollow guide frame 5 (shown in cross section in Fig. 6), in which the stripping column is arranged to move.

6, 6 designate the stripping tongs which are pivoted at the point 7 to a movable cross-head 8 upon which is mounted a series of sheaves 9. Above the cross-head 8 is a relatively-fixed cross-head 10 in which is mounted the double system of sheaves 11.

12 designates a cross-head which carries the bull-nose or ingot stop 13.

14, 14 are I-beams which connect the relatively-fixed cross-head 10 with the head 12 and whose webs form guides for the movable cross-head 8, as shown in Fig. 2.

15 (Fig. 6) designates angles which are attached to the I-beams 14, and which slide on angles 16 which are secured to the dependent guide frame 5, thereby forming a substantial guide for the entire stripping column.

The tongs 6 are provided with lateral extensions 6ª at their upper ends which embrace vertical guide rods 17. These guide rods 17 pass upwardly through extensions 18 on the upper cross-head 10, springs 19 being interposed between these extensions and the nuts or heads 20 at the upper ends of the rods for the purpose of relieving the shock, and to cause the tongs 6 to open more quickly, when the ingot mold is lowered on its stool. The lower ends of the rods 17 are provided with stops 21 arranged to be engaged by the extensions 6ª of the tongs, when the cross-head is at its lowest position, to cause the tongs to swing outwardly and open to a sufficient distance to pass over the top of the mold A.

22 and 23 designate two winding drums which are mounted upon shafts 24 journaled in the frame of the trolley carriage.

25 is an electric motor for operating the drums 22 and 23. The shaft of the motor has a pinion 26 which engages the teeth of a spur gear wheel 27 which is fixed to a sleeve 28 arranged to revolve loosely upon a shaft 29. The shaft 29 has a pinion 30 which engages a gear wheel 31 on the shaft 24 of the drum 22. The shaft 29 is also geared to the drum 23 by means of the gear wheels 32 and 33, shaft 34, pinions 35, and gear wheel 36, whereby the two drums 22 and 23 will be operated in unison by the motor 25, the sleeve 28 of the gear wheel 27 being connected to the shaft 29 in the manner now to be described. Fixed to the shaft 29 is an arm 37 which carries two pinions 38 which are arranged to mesh with a pinion 39 on the lower end of the sleeve 28, and also with the teeth of an internal rim gear 40 on the gear case 41. The gear case 41 is formed with a pinion 42 which meshes with the gear wheel 43 on a shaft 44, said shaft being driven by electric motor 45 through the system of gearing 46, 47, 48, 49, 50 and 51. The shaft 44 also carries a pinion 52, whose teeth engage the teeth of a vertical rack 53 which is secured to the upper or relatively-fixed cross-head 10.

54 is a continuous rope or cable which passes from the winding drum 22 down and around the system of sheaves carried by the two cross-heads 8 and 10, and thence upwardly and around the winding drum 23.

When the rack 53 is operated by the motor 45, the two drums 22 and 23 will be caused to revolve at a circumferential speed corresponding to the rate of movement of the rack. The cross-heads 8 and 10 will therefore be moved at a uniform speed, and none of the sheaves carried by these cross-heads will be operated. This is effected through the described gearing in the following manner. The shaft of the hoisting motor 25 is provided with the usual electro-magnetic brake device indicated at 55 which acts as a lock for the gear wheel 27, while the motor 25 is not operating. The gear wheel 43 will therefore be rotated by the motor 45, and will turn the pinion 42 on the hub of the gear case 41, thereby rotating this gear case. This causes the rotation of the pinions 38, and the consequent rotation of the shaft 29 without rotating the gear wheel 27. Through the shafts 29 and their gearing connections, as described, the drums 22 and 23 will be actuated in unison.

The motor 45 is provided with an electro-magnetic brake device 56 similar to the device 55, and of the usual character and which forms a lock for that motor and for the system of gearing driven thereby when the motor is at rest. When, therefore, the motor 25 is operated, the two drums 22 and 23 are actuated without operating the pinion 52 which engages the lifting rack 53. In this operation, the planetary gear casing 41 is held from rotation by the action of the brake 56 through the train of gearing, and the motor 25 rotates the gear wheel 27, the sleeve 28, and the pinion 39. The pinion 39 effects the rotation of the two pinions 38, and thereby rotates the shaft 29, the gears 42 and 43 remaining stationary.

The operation is as follows:—Assuming the lower cross-head to be at its lowest position with reference to the bull-nose or ingot stop 13, the tongs 6 are wide open. The entire stripping column is then lowered by the motor 45 until the nose or stop 13 comes in contact with the ingot. The motor 45 is then stopped, and the motor 25 is operated to rotate the drums 22 and 23. This raises the cross-head 8, closes the tongs 6, 6, and strips the mold. This is relatively a slow operation on account of the great power required. As soon, however, as the mold is freed from the ingot, the motor 45 is again operated, and the motor 25 is stopped. This causes the entire stripping column to be raised at a greatly increased speed, and the continued revolution of the drums 22, 23 also assists in hoisting the column. The ingot mold is then carried over to the ingot car, and is lowered thereon, the cross-head 8 being lowered until the tongs open, after which the crane is returned to strip another ingot. While the motor 45 is being operated to raise or lower the stripping column, the fact that the two drums 22 and 23 are being operated at the same circumferential speed as the speed of the rack, causes the two cross-heads to move in unison, without changing the distance between them, and without rotating any of the sheaves, as before described. Therefore, the end portions of the hoisting cable 54 will be simply wound or unwound by the drums. This, as stated, assists in operating the stripping column, and relieves the rack and pinion of a large part of the load. When the motor 25 is operated, the lower cross-head is simply raised or lowered with respect to the upper one, the stripping column remaining stationary.

By the means described, we are enabled to provide for a slow powerful action of the gearing; while the ingot is being stripped, and when this has occurred, the mold is raised at a very much faster speed. The use of a single hoisting rope or cable is also of advantage since it holds the cross-head in better position. Where two ropes or cables are employed, a difference in the stretch of the two cables is apt to cause the cross-head to sag or tip to one side.

Although we have shown and described and prefer to employ two winding drums, one for each end of the rope or cable, it will be obvious that but one drum may be employed, the other end of the continuous rope or cable being secured to the frame of the trolley carriage.

Various other changes may be made in the details of construction and arrangement of the parts without departing from the spirit and scope of our invention, since

What we claim is:—

1. In an ingot stripper, a mold-engaging device, a carrier therefor, an ingot stop, a carrier therefor, sheaves supported by the carriers, a single continuous rope or cable having its intermediate portion engaged with the sheaves on both carriers, and a winding means for at least one end portion of the rope or cable; substantially as described.

2. In an ingot stripper, a mold-engaging device, a carrier therefor, an ingot stop, a carrier therefor, sheaves supported by the carriers, a single hoisting rope or cable on the sheaves, two hoisting drums to which the ends of the rope or cable are connected, a motor for actuating said drums, and a second motor having gear connections for actuating the ingot stop carrier and also geared to said drums; substantially as described.

3. In ingot-stripping mechanism, a vertically-movable stripping column, a tongs carrier arranged to move with the column and also independently thereof, a hoisting rope or cable, a hoisting motor and gearing for operating the tongs carrier, and a motor and gearing for operating the column, the last-named motor and gearing being arranged to also wind up the hoisting rope or cable; substantially as described.

4. In ingot-stripping mechanism, a vertically-movable stripping column having a cross-head fixed thereto, a second cross-head movable with and independently of the column, and having tongs connected thereto, a hoisting rope or cable connecting the two cross-heads, a hoisting motor and gearing for operating said cable, and a second motor and gearing for operating the stripping column, the last-named motor and gearing being also arranged to operate the hoisting rope or cable to raise the movable cross-head without changing its relation to the fixed cross-head; substantially as described.

5. In ingot-stripping mechanism, a vertically-movable stripping column having a cross-head fixed thereto, an independently-movable cross-head having tongs connected thereto, a hoisting rope or cable connected to and connecting the two cross-heads, hoisting drums for the ends of said cable, a hoisting motor geared to the drums, and a second motor connected to the stripping column, and also geared to the drums; substantially as described.

6. In ingot-stripping mechanism, a vertically-movable stripping column, a cross-head fixed to said column, a tongs-carrying cross-head movable with the column and also independently thereof, a hoisting rope or cable connected to and connecting the two cross-heads, a motor and gearing for operating the hoisting cable, and a second motor and gearing for actuating the stripping column, and also arranged to operate the hoisting cable; substantially as described.

7. In ingot-stripping mechanism, a stripping column having an ingot stop and a rack, a cross-head fixed to said column, a cross-head movable with and also independently of the column, tongs carried by the last-named cross-head, a hoisting rope or cable connected to and connecting the two cross-heads, a winding drum for each end portion of the cable, a motor geared to the two drums, and a second motor also geared to the drum and to the rack of the stripping column; substantially as described.

8. In ingot-stripping apparatus, a stripping column, a tongs-carrier, a hoisting rope or cable for the tongs-carrier, a motor and gearing for actuating the hoisting cable, to move the tongs-carrier independently of the column, and a second motor having gearing for actuating the column, and also connected to the tongs-carrier hoisting gear; substantially as described.

9. In ingot-stripping mechanism, a stripping column, a tongs-carrier movable with and also independently of the stripping column, a hoisting rope or cable connected to the tongs-carrier, and also to the stripping column, a pair of hoisting drums to which the ends of the cable are connected, a shaft geared to both drums, a hoisting motor geared to said shaft, and a second motor geared to said shaft and also having connections for operating the stripping column; substantially as described.

10. In ingot-stripping mechanism, a vertically-movable tongs carrier, a vertically-movable stripping column, a pair of hoisting drums for the tongs-carrier, a shaft geared to both drums, a hoisting motor geared to said shaft, and a second motor also geared to said shaft and to the stripping column; substantially as described.

11. In ingot-stripping mechanism, a tongs-carrier, a rope or cable for operating the same, a pair of drums to which the respective end portions of the rope or cable are connected, a stripping column, a shaft geared to both drums, a motor, a system of planetary gearing connecting the motor with the drums, and a second motor geared to operate the stripping column, and also connected with the drum-operating shaft through the planetary gearing; substantially as described.

12. In ingot-stripping mechanism, a vertically-movable stripping frame or column having a vertical rack bar, a tongs-carrier movable with and also independently of the column, a hoisting rope or cable connected to and connecting the tongs with the stripping column, a pair of drums to which the end portions of the rope or cable are respectively connected, an operating shaft geared to both drums, a motor, a system of planetary gearing connecting the motor with the said shaft, and a second motor geared to the rack of the stripping frame, and also connected to said shaft through the planetary gearing; substantially as described.

13. In ingot-stripping mechanism, a vertically-movable stripping frame or column, a cross-head fixed thereto, sheaves journaled on the cross-head, a tongs-carrier also having sheaves journaled thereon, a hoisting rope or cable having its intermediate portion passed around the sheaves and the tongs-carrier and cross-head, two winding drums to which the end portions of the cable are connected, a motor geared to both drums, and a second motor having operating connections for the stripping frame or column, and also geared to the said drums; substantially as described.

14. In ingot-stripping mechanism, a vertically-movable stripping frame or column, sheaves journaled thereon, a tongs-carrier movable with and independently of the column, and also having sheaves, an actuating rope or cable having its intermediate portion passed around the two sets of sheaves, a pair of winding drums to which the ends of the rope or cable are connected, a motor geared to the drums, and a second motor having connections for operating the stripping frame or column, and also geared to said drums to operate them at a speed corresponding to the movement of the stripping frame or column, substantially as described.

15. In ingot-stripping mechanism, an ingot stop, a carrier therefor, sheaves supported by the carrier, a mold-engaging device, a carrier therefor, a single rope or cable having its intermediate portion engaged with the sheaves, and winding means for the rope or cable, the mold-engaging device having pivoted tong arms provided with lateral extensions, together with means for guiding the extensions and limiting their movement; substantially as described.

16. In ingot-stripping mechanism, a vertically-movable stripping frame or column, an independently-movable tongs-carrier, a pair of tongs pivoted to the carrier and having lateral extensions, a pair of guide rods carried by the stripping frame and engaged by the extensions, and stops on the guide rods; substantially as described.

17. In ingot-stripping mechanism, a vertically-movable stripping frame, an independently-movable tongs-carrier, tongs pivoted to the tongs-carrier, and having lateral extensions, and guide rods carried by the stripping frame, and having stops arranged to be engaged by the extensions, said rods having a limited independent vertical movement, and provided with cushioning springs; substantially as described.

18. In ingot stripping mechanism, a vertically-movable stripping frame or column having an ingot stop at its lower end, a vertical rack bar at its upper end, a motor having gear connections engaging the rack bar, a mold-engaging device having guides on the column, sheaves carried by the column, and winding mechanism connected to said sheaves; substantially as described.

19. In ingot-stripping mechanism, a vertically-movable tongs-carrier, two winding drums therefor, and a single continuous hoisting rope or cable having its intermediate portion connected to the tongs-carrier and its end portions connected to the respective drums, and means for operating the two drums in unison; substantially as described.

20. In an ingot stripper, an ingot stop, a vertically-movable frame carrying the stop, a mold-engaging device having an independent movement, sheaves on the mold-engaging device and on the frame, and a single continuous rope or cable having its intermediate portion on the sheaves of both the mold-engaging device and the frame, and at least one end portion connected to winding mechanism; substantially as described.

21. In an ingot stripper, a vertically-movable ingot stop, a carrier therefor, a mold-engaging device, a carrier therefor, sheaves on the carriers, a single continuous hoisting rope or cable having its intermediate portion on both sets of the sheaves, winding means to which at least one end portion of the cable is connected, a motor for actuating the drums, and a second motor for actuating the stop carrier; substantially as described.

22. In ingot-stripping mechanism, a vertically-movable stripping frame or column having an ingot stop at its lower end, a hollow depending guide frame for the frame or column, a carrier for the stop having guides in the frame, a vertical rack bar at the upper end of the frame or column, and a motor having gear connections engaging the rack bar; substantially as described.

23. In an ingot stripper, a crane carriage having a depending hollow guide frame, an ingot stop, a carrier for the stop movable in the guide frame, and a mold-engaging device having guides on the stop carrier; substantially as described.

24. In an ingot stripper, a depending open frame carrying an ingot stop at its lower end, and having its lateral portions provided with vertically-extending guide-ways, a mold engaging device, and a carrier therefor engaging the said guide-ways and moving therein within the open frame; substantially as described.

25. In an ingot stripper, a crane carriage having a depending hollow guide frame, an ingot stop carrier movable within and provided with guides on the frame, a mold-engaging device, and a carrier therefor movable within and guided by the stop carrier; substantially as described.

26. In ingot-stripping mechanism, a vertically-movable tongs-carrier, a vertically-movable ingot stop, a carrier therefor, a single continuous hoisting rope or cable having its intermediate portion connected to the tongs-carrier and to the ingot stop carrier, and winding means to which at least one end of the hoisting rope or cable is connected; substantially as described.

In testimony whereof, we have hereunto set our hands.

GEORGE W. SHEM.
HOMER W. ISRAEL.

Witnesses:
JOHN MILLER,
H. M. CORWIN.